Sept. 2, 1969     T. D. LODE     3,465,361

ELECTROMAGNETIC WAVE RETARDING STRUCTURE

Filed Jan. 13, 1965

INVENTOR
TENNY D. LODE

United States Patent Office 3,465,361
Patented Sept. 2, 1969

3,465,361
ELECTROMAGNETIC WAVE RETARDING STRUCTURE
Tenny D. Lode, Madison, Wis., assignor to Rosemount Engineering Company, Minneapolis, Minn., a corporation of Minnesota
Filed Jan. 13, 1965, Ser. No. 425,188
Int. Cl. H01q 15/08
U.S. Cl. 343—911                    4 Claims

ABSTRACT OF THE DISCLOSURE

A structure made to pass an electromagnetic wave and change its velocity with little loss due to reflection. Two materials are arranged within the structure so that electric field lines are passed predominantly through high dielectric constant material and magnetic field lines are passed predominantly through high magnetic permeability material thus allowing independent control over velocity and impedance through selection of materials.

---

This invention relates to the fabrication of materials and structures with relatively low velocities of propagation for electromagnetic waves and, if desired, low reflection coefficients with respect to free space or other media. Applications include radar and microwave lenses and wave absorbers which may be thin with respect to the free space wave length of the controlled or absorbed energy.

The size of many microwave devices and structures is at least in part determined by the wavelength of the controlled energy. By reducing the wavelength, one or more dimensions of the device or structure may be made smaller. A focusing lens corresponding to a convex optical lens is an example of a wave retarding device. The focusing action results from a greater retarding of energy near the central portion of the beam.

The transmission line analogy for the propagation of electromagnetic waves is often convenient because of the similarity of the mathematics. For a material with magnetic permeability $\mu$ and dielectric constant $\epsilon$, the propagation velocity will be $$V = \frac{1}{\sqrt{\mu \epsilon}}$$

The ratio of the magnitudes of the electric and magnetic field vectors of a propagating electromagnetic wave has the dimensions of an electrical resistance in the system of units employed and is called the intrinsic impedance of the medium. In terms of the permeability and dielectric constant of the medium, the intrinsic impedance is $$\eta = \sqrt{\mu/\epsilon}$$

For free space, $$V_0 = \frac{1}{\sqrt{\mu_0 \epsilon_0}} \approx 3 \cdot 10^8 \text{ meters/sec.} \quad \eta_0 = \sqrt{\mu_0/\epsilon_0} \approx 377 \text{ ohms}$$

When an electromagnetic wave passes through a surface boundary from one medium to another, the wave may be reflected and/or refracted depending on the characteristics of the two mediums. Refraction effects are determined by the relative propagation velocities. The reciprocal of the relative propagation velocity corresponds to the relative index of refraction as used in the analylsis of optical systems. Reflection effects are determined by the relative intrinsic impedances of the two mediums. If the intrinsic impedances are equal, there will normally be no reflection of the wave. If the intrinsic impedances are unequal, energy will be partially reflected as in the analogous case of the mis-matched transmission lines.

This apparent independence of refraction and reflection effects may appear to be in contradiction with observed optical phenomena. At the frequencies and wavelengths corresponding to visible light, the effective magnetic permeability of transparent materials is essentially equal to that of free space. Hence, the optical propagation velocity (or the reciprocal of the index of refraction) and the intrinsic impedance will be functions of only the dielectric constant and may be expected to be proportional to each other. At radio, radar, and microwave frequencies, where magnetic permeabilities higher than that of free space may be realized, the propagation velocity and intrinsic impedance may be independently variable.

In practice, little use has been made of this possible independence of the propagation velocity and the intrinsic impedance of a medium. Materials with high magnetic permeabilities usually have dielectric constants close to that of free space while materials with high dielectric constants usually have magnetic permeabilities close to that of free space. Page 289 of the book "Fields and Waves in Modern Radio" by Simon Ramo and John R. Whinnery (2nd edition) published by John Wiley & Sons, Inc., New York, 1953,, Library of Congress catalog card No. 53–6615) states, "from Equation 1, we see that there is no reflection if there is a match of impedances, $\eta_1 = \eta_2$. This would of course occur for the trivial case of identical dielectrics, but also for the case of different dielectrics if they could be made with the same ratio of $\mu$ to $\epsilon$. This latter case is not of practical importance since we do not commonly find high frequency dielectric materials with permeability different from that of free space, but it is interesting since we might not intuitively expect a reflectionless transmission in going from free space to a dielectric with both dielectric constant and permeability increased by, say, ten times."

Hence, most mediums with low propagation velocities will be mis-matched to free space because the ratio of the intrinsic impedances will be approximately the same as the ratio of the propagation velocities.

One possibility would appear to be the use of a combination of two materials, one chosen for a high magnetic permeability and the other chosen for a high dielectric constant. However, it is not merely a matter of selecting two materials and "mixing well." As an example, we might consider a suspension of high magnetic permeability particles in a dielectric of high dielectric constant. The effective dielectric constant of the mixture will be high because electric field lines may pass through the mixture while remaining entirely within the high dielectric constant material. However, the magnetic permeability of the mixture will be relatively low as magnetic field lines must pass through the low permeability-high dielectric constant material. Mixtures of two powders may be expected to be even worse since neither electric nor magnetic field lines will be able to pass entirely through materials of high permeability or high dielectric constant. The magnetic field lines will be impeded by both air gaps and the low permeability-high dielectric constant material while the electric field lines will be similarly impeded by both air gaps and the low dielectric constant-high magnetic permeability material. What is required is a configuration which will allow electric field lines to pass essentially entirely through high dielectric constant material while allowing magnetic field lines to pass essentially entirely through high magnetic permeability material.

An object of the present invention is to provide methods and means for the fabrication of composite structures of two or more materials such that electric field lines may pass predominantly through material of high dielectric constant and magnetic field lines may pass predominantly through material of high magnetic permeability. A further object is to allow the fabrication of materials and structures with relatively low propagation velocities for electromagnetic waves and, if desired, relatively low reflection coefficients with respect to free space or other media.

Figure 1:
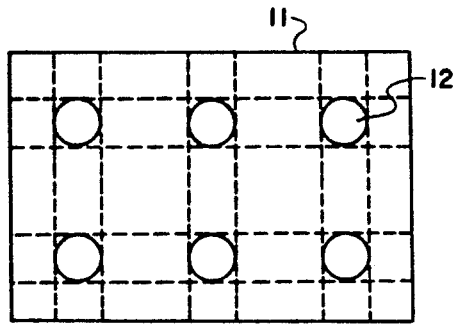
FIGURE 1 is a pictorial illustration of a first form of the invention.
Figure 2:
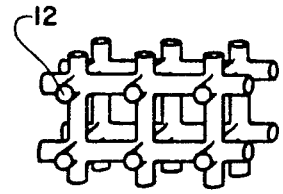
FIGURE 2 is a pictorial illustration of an internal portion of the structure illustrated in FIGURE 1, further illustrating a first form of the invention.

Referring now to the drawings, FIGURE 1 includes a block 11 of high permeability magnetic material containing channels 12 of a high dielectric constant material. FIGURE 2 illustrates dielectric channels 12 as they might appear if high permeability block 11 were removed.

The structure of FIGURES 1 and 2 may be considered as a rectangular block of high permeability magnetic material with a series of mutually intersecting holes, parallel to the three perpendicular axes of the block. In practice, it is expected that a large number of such holes would be required. For clarity, FIGURES 1 and 2 show only a few holes. The spacing between the holes will normally be small with respect to the shortest expected wavelength at the propagation velocity in the composite structure. The holes in block 11 are filled with a material of high dielectric constant, forming dielectric channels 12. It will then be possible for magnetic field lines to traverse paths within the composite structure while remaining entirely within high permeability block 11. Electric field lines may similarly traverse paths within the composite structure while remaining entirely within the pattern of intersecting channels 12. Thus, the structure of FIGURES 1 and 2 will appear to have both a high magnetic permeability and a high dielectric constant. If the spacing between the holes or channels is small with respect to the wavelength at the reduced propagation velocity, the structure of FIGURE 1 will propagate electromagnetic waves at a greatly reduced velocity. Because both the magnetic permeability and the dielectric constant may be higher than that of free space, the intrinsic impedance of the composite structure may be higher, lower, or approximately equal to that of free space. The use of a dielectric material of higher dielectric constant, larger dielectric channels and/or a greater number of dielectric channels will decrease the apparent intrinsic impedance. The use of a magnetic material of higher magnetic permeability, smaller dielectric channels and/or a smaller number of dielectric channels will increase the apparent intrinsic impedance.

It is evident that other structures in addition to the one specifically shown in FIGURES 1 and 2 may be devised which will allow combinations of high permeability and high dielectric constant materials into a single structure with both a high permeability and a high dielectric constant. For example, channels of a high magnetic permeability material within a surrounding high dielectric constant material might be employed. Many other configurations are also possible.

Figure 3:
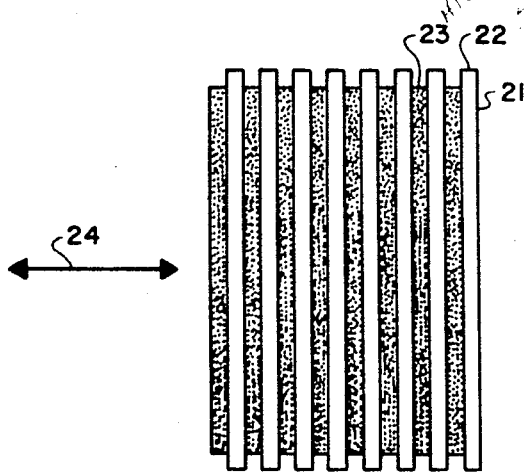
FIGURE 3 is a section view illustrating a second form of the invention.

In some instances, it will be of interest to propagate electromagnetic waves principally along one axis. In such cases, the apparent intrinsic impedance and effective velocity of propagation will be largely determined by the apparent magnetic permeability and dielectric constant of the structure in directions perpendicular to the direction of propagation. Reference is now made to FIGURE 3 which illustrates a retarding structure 21 consisting of a series of alternating plates of high dielectric constant material, such as plate 22, and plates of high magnetic permeability, such as plate 23. Double headed arrow 24 indicates the assumed directions of electromagnetic wave propagation. FIGURE 3 illustrates a structure consisting of alternate layers of high permeability and high dielectric constant material. Both the apparent magnetic permeability and the apparent dielectric constant of the structure will be high in directions parallel to the planes of the layers. If the individual layers are thin with respect to the wave length at the reduced velocity of propagation, and the dimensions of the structure in directions perpendicular to the direction of propagation are large with respect to the wave length, the structure of FIGURE 3 will exhibit properties similar to those of the structure of FIGURE 2 for electromagnetic waves propagating in directions as indicated by arrow 24.

As in the structures of FIGURES 1 and 2, the apparent intrinsic impedance and other characteristics of the structure of FIGURE 3 may be controlled by varying the magnetic permeability, dielectric constant and/or thicknesses of the layers of the individual materials employed.

The preceding description has been concerned primarily with the fabrication of electromagnetic wave retarding materials rather than their application. Such composite materials will find applications similar to those for more conventional wave retarding materials. For example, a wave retarding material fabricated in accordance with the present invention may be used for microwave lenses for focusing or defocusing microwave energy and in microwave prisms for bending beams of microwave energy.

Comparative terms such as "high" and "low" are used in the following claims. Such terms are intended to describe values or properties of materials or structures with respect to those of free space or other surrounding media.

What is claimed is:

1. A composite structure with relatively low electromagnetic wave propagation velocity for a wave signal including a continuously connected mass of a first material, a second material imbedded in said first material and forming a plurality of interconnecting channels within said first material wherein there are a plurality of interconnections between channels and the separation between adjacent interconnections is less than the wave length of said wave signal, and wherein one of said first and second materials is of relatively high magnetic permeability and the other of said materials is of relatively high dielectric constant.

2. A composite structure with a relatively low electromagnetic wave propagation velocity including a continuously connected mass of a first material of relatively high magnetic permeability and low delectric constant surrounding a plurality of mutually perpendicular interconnecting channels of a second material of relatively high dielectric constant and low magnetic permeability.

3. A composite structure of relatively low electromagnetic wave propagation velocity including a continuously connected mass of a first material of relatively high dielectric constant and low permeability surrounding a plurality of mutually perpendicular interconnecting channels of a second material of relatively high magnetic permeability and low dielectric constant.

4. A composite structure of relatively low electromagnetic wave propagation velocity for an electromagnetic wave signal including first and second materials in contiguous relation to each other, said first material having a high magnetic permeability and low dielectric constant and wherein portions of said first material have dimensions greater than the wave length of said wave signal in planes substantially parallel to magnetic field lines of said wave signal and portions of said first material have a dimension smaller than the wave length of said wave signal in planes substantially parallel to the propagation direction of said wave signal, said second material having a high dielectric constant and low magnetic permeability and wherein portions of said second material have dimension greater than the wave length of said wave signal in planes substantially parallel to electric field lines of said wave signal and portions of said second material have a dimension smaller than the wave length of said wave signal in planes substantially parallel to the propagation direction of said wave signals, and wherein one of said first and second materials comprises an array of interconnected channels oriented in three orthogonal directions and encapsulated within a mass of the other of said first and second materials.

References Cited

UNITED STATES PATENTS

| | | | |
|---|---|---|---|
| 3,324,426 | 6/1967 | Brueckmann | 333—31 |
| 2,511,610 | 6/1950 | Wheeler | 343—910 |
| 2,840,820 | 6/1958 | Southworth | 343—909 |
| 2,929,034 | 3/1960 | Doherty | 333—31 |
| 3,254,345 | 5/1966 | Hannan | 343—911 |
| 3,310,807 | 3/1967 | Kofoid | 343—705 |
| 3,310,808 | 3/1967 | Friis | 343—911 |

ELI LIEBERMAN, Primary Examiner